Figure 1:
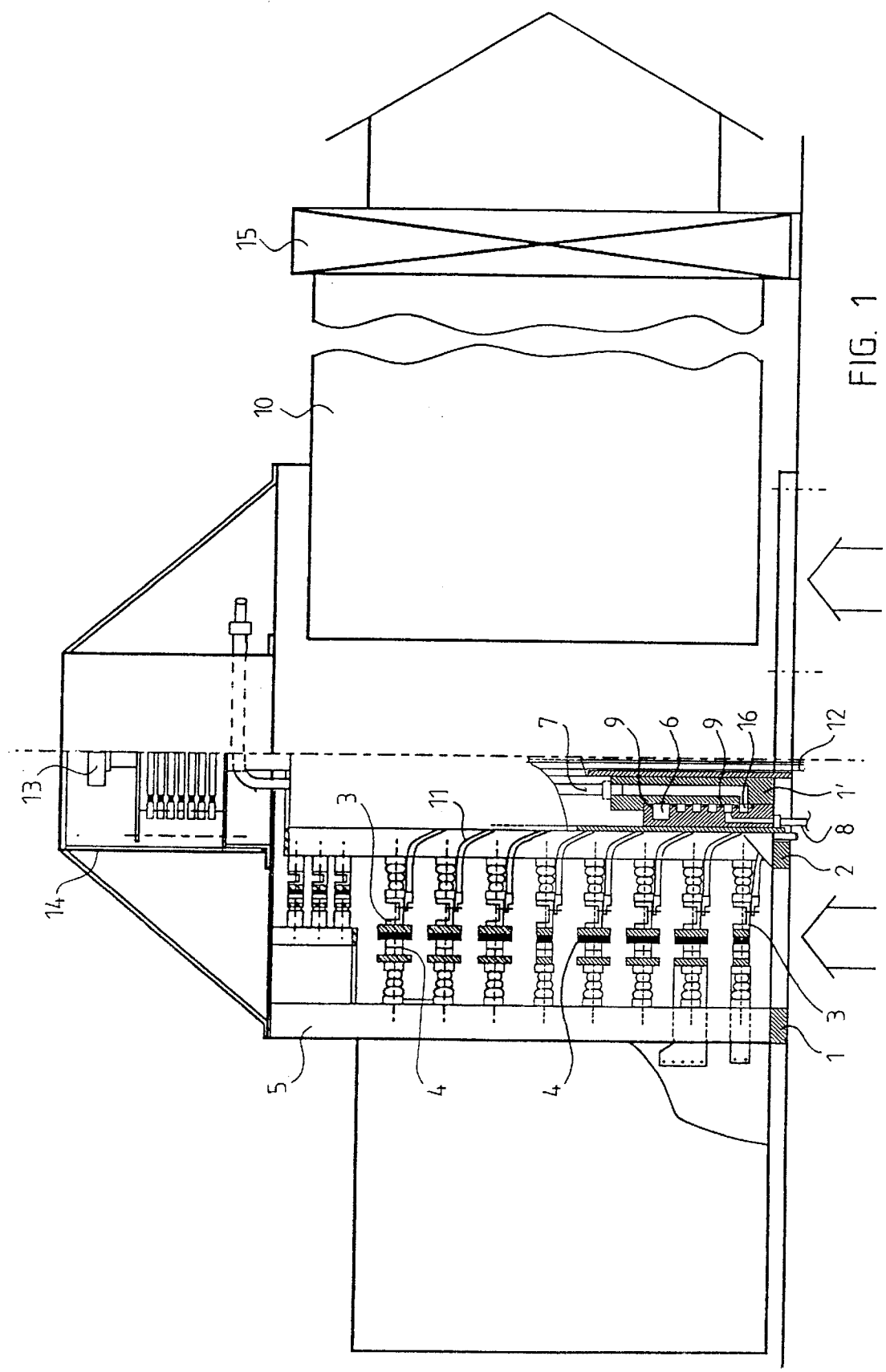

United States Patent [19]
Lassila et al.

[11] Patent Number: 5,923,113
[45] Date of Patent: Jul. 13, 1999

[54] SLIP-RING ARRANGEMENT WITH INTEGRATED ROTARY SWIVEL JOINT FOR LIQUIDS

[75] Inventors: Tommi Lassila, Espoo; Timo Leppänen, Kerava, both of Finland

[73] Assignee: ABB Azipod Oy, Helsinki, Finland

[21] Appl. No.: 08/836,535

[22] PCT Filed: Nov. 1, 1995

[86] PCT No.: PCT/FI95/00603

§ 371 Date: Apr. 30, 1997

§ 102(e) Date: Apr. 30, 1997

[87] PCT Pub. No.: WO96/14678

PCT Pub. Date: May 17, 1996

[30] Foreign Application Priority Data

Nov. 3, 1994 [FI] Finland ................................. 945187

[51] Int. Cl.⁶ ................................................. H01R 39/08
[52] U.S. Cl. ........................ 310/232; 310/59; 310/62; 310/54; 310/227; 310/58; 310/52
[58] Field of Search .................................... 310/227, 232, 310/54, 59, 58, 62

[56] References Cited

U.S. PATENT DOCUMENTS

| | | | |
|---|---|---|---|
| 3,851,663 | 12/1974 | Neuko | 310/232 |
| 3,984,716 | 10/1976 | Stark | 310/232 |
| 4,043,621 | 8/1977 | Heinz | 308/189 |
| 4,177,869 | 12/1979 | Crabiel | 310/232 |
| 4,334,159 | 6/1982 | Ooki et al. | 310/54 |
| 4,410,821 | 10/1983 | Kurt | 310/227 |
| 4,484,049 | 11/1984 | Ahner et al. | 219/10.51 |
| 4,484,083 | 11/1984 | Jefferies | 290/45 |
| 4,520,284 | 5/1985 | Wolcott | 310/42 |
| 4,544,215 | 10/1985 | Fritsch | 399/5 M |
| 5,210,452 | 5/1993 | Pratap et al. | 310/12 |

FOREIGN PATENT DOCUMENTS

| | | | |
|---|---|---|---|
| 1311657 | 9/1988 | Canada | 310/232 |
| WO790144 | 3/1979 | WIPO | 310/232 |

*Primary Examiner*—Elvin G. Enad
*Attorney, Agent, or Firm*—Watson Cole Grindle Watson P.L.L.C.

[57] ABSTRACT

An arrangement for the transfer of electric current, a liquid medium and a gaseous medium between fixed and rotatable sections. A protective casing surrounds sliding brushes pressing against sliding surfaces. A passage for each medium is parallel with rotation and arranged at a boundary surface between the fixed and rotating sections. Passage transfer pipes in both sections communicate with the passages. A collector chamber arranged in the fixed section and an outlet pipe lead the gaseous medium out of the tubular rotating section. The arrangement for the transfer of a liquid medium is coaxially arranged inside the arrangement for the transfer of electric current. The protective casing provides a collector chamber for the gaseous medium.

6 Claims, 2 Drawing Sheets

SLIP-RING ARRANGEMENT WITH INTEGRATED ROTARY SWIVEL JOINT FOR LIQUIDS

A This invention relates to an arrangement for the transfer of electric current, a liquid medium and a gaseous medium between a section in a fixed position and a section rotating in relation thereto, i.e. a sort of a slip-ring arrangement, the arrangement for the transfer of electric current comprising sliding surfaces supported by the rotating section and sliding brushes supported by the fixed section and arranged to press against the sliding surfaces, and a protective casing surrounding them, the arrangement for the transfer of a liquid medium comprising for each medium circuit a passage parallel with the rotation and arranged at the boundary surface between the fixed section and the rotating section, with which passage transfer pipes in both sections communicate and which is sealed in the axial direction of the rotating section with seals arranged on both sides of the passage, and the arrangement for the transfer of a gaseous medium comprising a collector chamber arranged in the fixed section and at least one outlet pipe connected to said chamber for leading the gaseous medium out of the rotating section, which has been given a tubular form.

An arrangement described above may have to be utilized for instance when different kind of equipment is hung on a rotating, vertical tubular shaft via which electric current, lubricating oil, cooling air etc. has to be fed to said equipment. Such a situation may arise e.g. in connection with a propeller drive arrangement described in Canadian Patent 1,311,657. In this arrangement the motor of a ship is arranged in a cylindrical chamber, which is secured pivotably to the body of the ship by means of a tubular shaft. Electric current to the electric motor arranged in said chamber is fed via said tubular shaft. Likewise necessary hydraulic fluids, lubricating oils and possible other liquids, such as bilge water, also have to be fed via said rotating tubular shaft. In addition, the motor may have to be cooled with coolant air, also via said tubular shaft.

If it is desired to construct the tubular shaft freely rotating or at least to allow the tubular shaft a relatively wide range of rotation, the different feeding arrangements needed have to be constructed by means of the arrangements described in the preamble. A problem in that case is the large space required by the different feeding arrangements in the axial direction of the tubular shaft. Such a considerable length is problematic for two reasons. Firstly, the space available inside the body of a ship is limited and the length of the necessary arrangements should thus be as small as possible. Secondly, the considerable length of the arrangements above the supporting point of the tubular shaft causes to the tubular shaft itself torsional forces that are difficult to control. For instance the slip-rings and the cabling necessary for the feeding arrangements for electricity easily weigh several hundreds of kilos when the power required by the motor is of the order of megawatts.

It is the object of the present invention to provide an arrangement for transmitting electric current, a liquid medium and a gaseous medium between a section fixed in its position and a section rotating in relation thereto so that the space occupied by this arrangement may be minimized especially in the axial direction of the rotating section. This is achieved with the arrangement of the invention, which is characterized in that the arrangement for the transfer of a liquid medium is coaxially arranged inside the arrangement for the transfer of electric current and that the protective casing of the arrangement for the transfer of electric current is essentially gas, tight and provides a collector chamber for the gaseous medium.

In the arrangement of the invention electric current, a liquid medium and a gaseous medium may thus be transmitted via a space the axially required space of which corresponds in practice with the space required by the arrangement for the transfer of electric current.

The cross section of the protective casing of the arrangement for the transfer of electric current is preferably a polygon and an outlet pipe for the gaseous medium is arranged to replace one or more sides of the protective casing. By means of this procedure the direction of the exhaust air pipe may easily be chosen appropriate and on the other hand the volume flow needed may easily be achieved by taking into use an adequate number of the sides of the protective casing.

If the angle of rotation of the rotating section is not limited, both the sliding surfaces of the arrangement for the transfer of electric current and the passages of the arrangement for the transfer of a liquid medium, arranged in the rotating direction, are annular. By means of such sliding rings and, on the other hand, annular passages the rotation may be completely free and an alternating motion is not even necessary for the extreme positions to be reached.

On the other hand, the total length of the arrangement of the invention may be further shortened if the angle of rotation of the rotating section is limited between ±90° or less. If in fact in this case the sliding surfaces of the arrangement for the transfer of electric current are arranged in the shape of a semi-circle or possibly even shorter sectors, two or even more transfer connections may be placed in the same height position. Naturally, the same procedure may also be applied to the arrangement for the transfer of a liquid medium, but the need for this is practically quite small because of the narrowness of the passages of the liquid medium. In addition, the passages of the arrangement for the transfer of a liquid medium would have to be processed by milling instead of using lathe work, which would complicate production.

Furthermore, it is preferable that, in addition to the passages connected to the medium circuits, the arrangement for the transfer of a liquid medium comprises a passage arranged below these passages and provided with a transfer tube on the side of the fixed section only for use in detecting possible leakages in the passages connected to the medium circuits. By means of such an extra passage, possible leaks in the medium circuits are easily detected and, at least equally importantly, media are prevented from leaking inside the tubular shaft.

Figure 2:
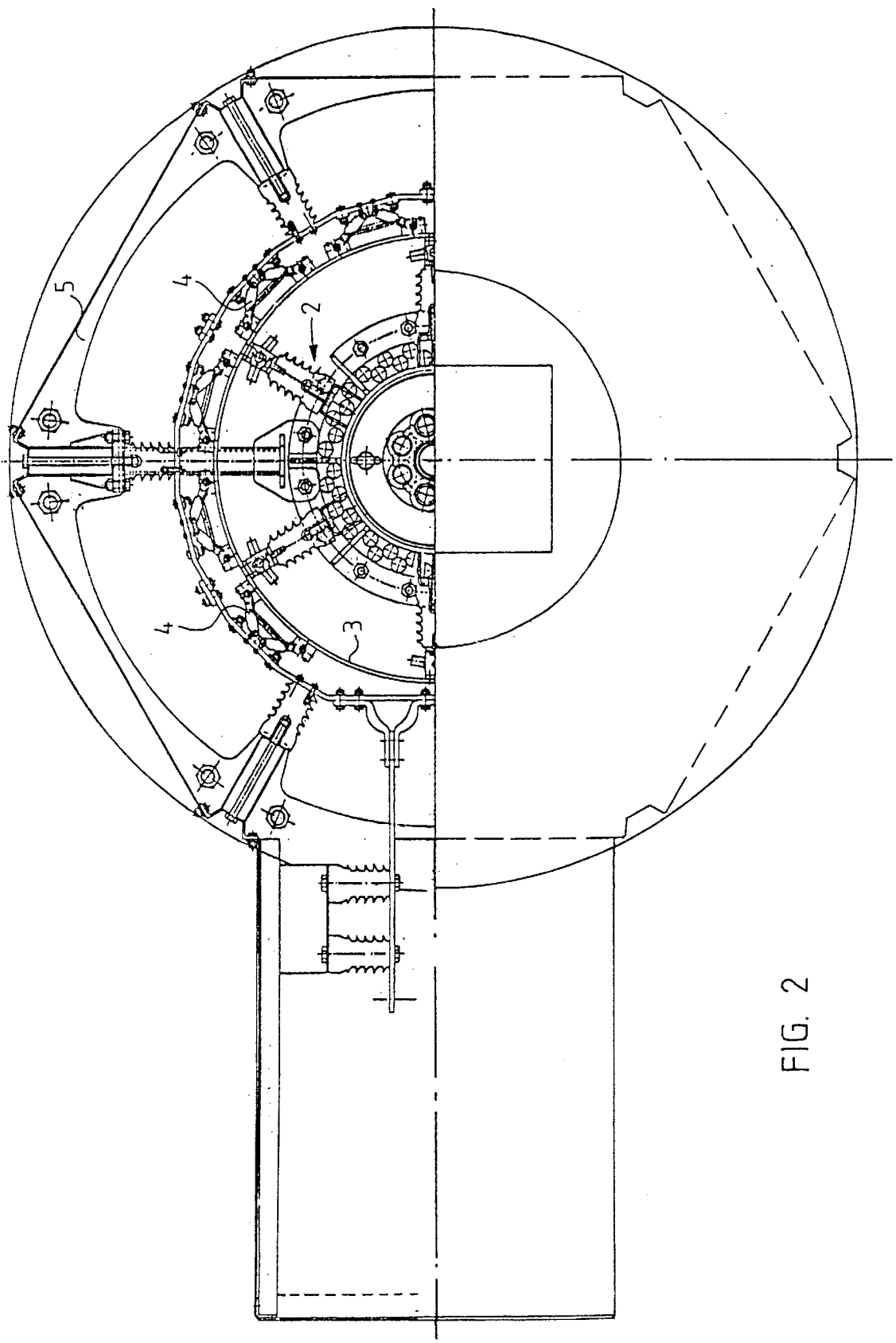

In the following the arrangement of the invention will be described in greater detail with reference to the accompanying drawing, in which FIG. 1 is a side view and a partial section of the arrangement of the invention and FIG. 2 is a top view and a partial section of the arrangement according to FIG. 1.

FIG. 1 is a side view and a partial section of the arrangement of the invention. Reference numeral 1 denotes a section in a fixed position of the arrangement. Reference numeral 2 denotes a section rotating relative to the fixed section 1, the former being thus connected to e.g. the tubular shaft of the propeller drive arrangement described in Canadian Patent 1,311,657.

In the arrangement according to FIGS. 1 and 2, the arrangement for the transfer of electric current comprises sliding brushes 4 connected to the fixed section 1, via which brushes electric current can be fed into the rotating section.

As is evident from FIG. 1, the sliding brushes 4 are arranged at a plurality of different levels, in order that the necessary electric current can be fed into the electric devices arranged in the rotating section. The arrangement described in FIG. 1 may be applied to feeding an electric motor equipped with two triphase stator windings. Slip-rings 3 whereto appropriate transfer cables 11 are connected are connected to the arrangement for feeding electric current to the rotating section 2. In practice the space in the vertical axial direction needed by the arrangement for feeding electric current is relatively large as the slip-rings have to be placed at a relatively long distance from one another to avoid spark-over.

In the arrangement of FIGS. 1 and 2 the rotating section is realized freely rotating, and thus the slip-rings 3 are completely annular. If the angle of rotation is limited e.g. to the value ±80°, one slip-ring could be divided into two sectors of at most 180° and thus two electric feeding connections could be constructed at the same level.

The arrangement for the transfer of a liquid medium, which forms one part of the arrangement of the invention, comprises, per each medium circuit, an annular passage 6, arranged in the direction of the rotation at the boundary surface between a fixed section 1' and the rotating section 2, with which passage transfer pipes, arranged in the axial direction of the rotating section in both sections 1' and 2, communicate. The transfer pipe connected to the rotating section 2 is denoted by reference numeral 8. A transfer pipe connected to the fixed section 1' and functioning as a part of one of the medium circuits is not shown in the Figure, but such a pipe would correspond to a transfer tube 7 shown in the Figure, the purpose of which will be described below. The annular passages 6 are sealed with seals 9, arranged in the axial direction of the rotating section on both sides of the passage. In the relation described above, the arrangement for the transfer of a liquid medium, such as water and oil, is conventional per se. In accordance with the invention the procedure differs from the conventional in that the arrangement for the transfer of a liquid medium is coaxially arranged inside the arrangement for the transfer of electrical current. In this way the space required by them in the axial direction corresponds in practice to the axial length of the arrangement for the transfer of electric current.

The arrangement for the transfer of a liquid medium comprises, in addition to the passages 6 connected to the medium circuits, a passage 16, arranged below these passages and equipped with a transfer pipe 7 only on the side of the fixed section 1', for use in detecting possible leakages in the passages 6 connected to the medium circuits. As the passage 16 is located below the other passages 6 and as it is not under pressure unlike the other passages 6, possible liquid leaking from the other passages 6 is gathered into the passage 16. This prevents the liquids from leaking downward and also their access into free air space, where they could vaporize. As stated above and as can be seen in FIG. 1, the transfer pipe 7 connected to the passage 16 rises upward above the arrangement for the transfer of a liquid medium. As the liquids in the passages 6 are under pressure, the level of the liquid in the pipe 7 rises under the influence of this pressure, and may easily be detected by means of a suitable probe.

As is evident from FIG. 1, the transfer pipe 8 for the liquid medium is connected to the rotating section whereas the transfer pipe 7 is connected to the fixed section 1', the latter forming thus in practice an annular fixed section between two rotating sections. This is based on the fact that a shaft 12, rotating with the rotating section 2, is arranged at the axial middle line of the arrangement, inside of which shaft are arranged optical and electrical cables. These optical cables transmit especially different measuring information from the equipment arrange in the rotating section. The messages received in the fixed section from these optical cables are transferred by a separate optical slip-ring package 13, arranged in a space 14 above a protective casing 5 designed for the arrangement for the transfer of electric current. As regards this optical transfer arrangement the arrangement shown in FIG. 1 does not differ from the conventional.

As has become evident above, the equipment inside the tubular shaft and the cylindrical equipment space connected thereto have to be cooled with coolant air. This coolant air is fed into the equipment via separate passages, situated at different levels, in practice lower than the arrangements described in FIGS. 1 and 2, and they have not been shown in the Figures for clarity. These passages are conventional per se. Removal of the gaseous medium, i.e. in practice most often the coolant air, is, however, realized differently from the conventional in the arrangement of the invention. In this arrangement the protective casing 5, arranged around the feeding arrangement for electric current, is utilized. As is evident especially from FIG. 2, the cross section of the protective casing 5 is arranged in the shape of a polygon. Additionally, the protective casing is gas tight to a degree that it may be used as a collector chamber for the coolant air to be removed. Thus the hot air discharged from the tubular shaft may be led to an outlet passage replacing one of the side walls of the protective casing 5. This outlet passage is denoted by the reference numeral 10 in FIG. 1. In FIG. 1 a heat exchanger 15 has been additionally connected to the outlet passage, from which heat exchanger the coolant air is thus removed relatively cool. By the use of a protective casing, which is in any case needed in connection with the arrangement for feeding electric current, as a collector chamber, the structure of the equipment may be essentially simplified and its total length may be essentially shortened in the axial direction of the rotating section.

The arrangement of the invention has been explained in the above only in principle and by way of one exemplifying embodiment. It is thus evident that the arrangement of the invention may be realized by means of mechanical structures that differ considerably from the ones described, without, however, departing from the protective scope of the appended claims. The idea of the invention is to decrease the axial length needed by different feeding arrangements by realizing the collection of the coolant air to be removed by means of a protective casing of the feeding arrangement for electric current and additionally by placing the feeding arrangement for the liquid medium coaxially inside the feeding arrangement for electric current.

We claim:

1. Arrangement for the transfer of electric current, a liquid medium and a gaseous medium each having a medium circuit between a section in a fixed position and a section rotating in relation thereto, the arrangement for the transfer of electric current comprising sliding surfaces supported by the rotating section and sliding brushes supported by the fixed section and arranged to press against the sliding surfaces, and a protective casing surrounding them, the arrangement for the transfer of a liquid medium comprising for each medium circuit a passage parallel with the rotation and arranged at a boundary surface between the fixed section and the rotating section, with which passage transfer pipes in both sections communicate and which is sealed in the axial direction of the rotating section with seals arranged on both sides of the passage, and the arrangement for the transfer of a gaseous medium comprising a collector chamber arranged in the fixed section and at least one outlet pipe connected to said chamber for leading the gaseous medium out of the rotating section, which has been given a tubular form, wherein the arrangement for the transfer of a liquid medium is coaxially arranged inside the arrangement for the transfer of electric current and the protective casing of the arrangement for the transfer of electric current provides a collector chamber for the gaseous medium.

2. Arrangement as claimed in claim 1, wherein the cross section of the protective casing (5) of the arrangement for the transfer of electric current is a polygon and that said, at least one outlet pipe (10) for the gaseous medium is arranged to replace one or more sides of the protective casing.

3. Arrangement as claimed in claim 1, wherein the angle of rotation of the rotating section (2) is not limited, wherein both the sliding surfaces (3) of the arrangement for the transfer of electric current and the passages (6) of the arrangement for the transfer of a liquid medium, arranged in the rotating direction, are annular.

4. Arrangement as claimed in claim 1, wherein the angle of rotation of the rotating section is at most ±80°, wherein the sliding surfaces of the arrangement for the transfer of electric current cover a sector of at most 180° of the periphery of the rotating section.

5. Arrangement as claimed in claim 1 wherein the arrangement for the transfer of a liquid medium comprises, in addition to the passages (6) connected to the medium circuits, a passage (16), arranged below these passages and equipped with a transfer pipe (7) only on the side of the fixed section (1'), for use in detecting possible leakages in the passages (6) connected to the medium circuits.

6. An arrangement for the transfer of electric current, a liquid medium and a gaseous medium each having a corresponding medium circuit between a fixed section and a tubular section rotatable relative to the fixed section comprising:

slidable surfaces supported by the rotatable section and slidable brushes supported by the fixed section said brushes arranged to press against the slidable surfaces and a protective casing surrounding the brushes and slidable surfaces, the arrangement for the transfer of the liquid medium and gaseous medium each including a passage for each medium circuit parallel with a direction of rotation of the rotatable section and arranged at a boundary surface formed between the fixed section and the rotatable section;

passage transfer pipes in each of the sections communicating with each passage, and seals for sealing the passages in an axial direction arranged on both sides of the passages; and the arrangement for the transfer of a gaseous medium including a first collector chamber arranged in the fixed section and at least one outlet pipe connected to said chamber for leading the gaseous medium out of the rotatable section, the arrangement for the transfer of the liquid medium being coaxially arranged inside the arrangement for the transfer of electric current, and further including a passage arranged below the passages for the medium circuits and equipped with a transfer pipe only on the side of the fixed section for detecting leaks in the passages connected to the medium circuits and the protective casing of the arrangement for the transfer of electric current providing a second collector chamber for the gaseous medium.

* * * * *